C. W. HAZELETT.
STORAGE BATTERY LAMP.
APPLICATION FILED OCT. 2, 1918.
1,338,222.
Patented Apr. 27, 1920.
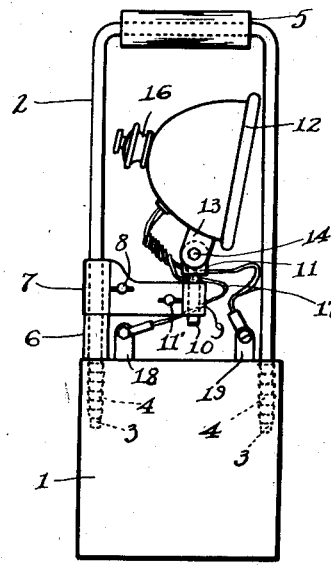
Fig. 1
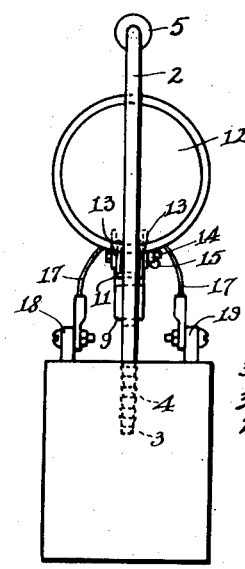
Fig. 2
Fig. 3
Fig. 5
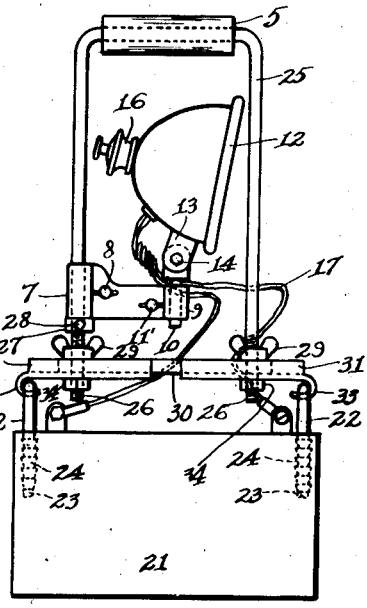
Fig. 4
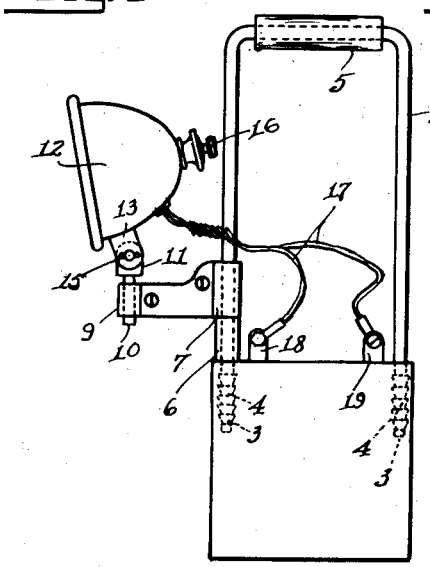
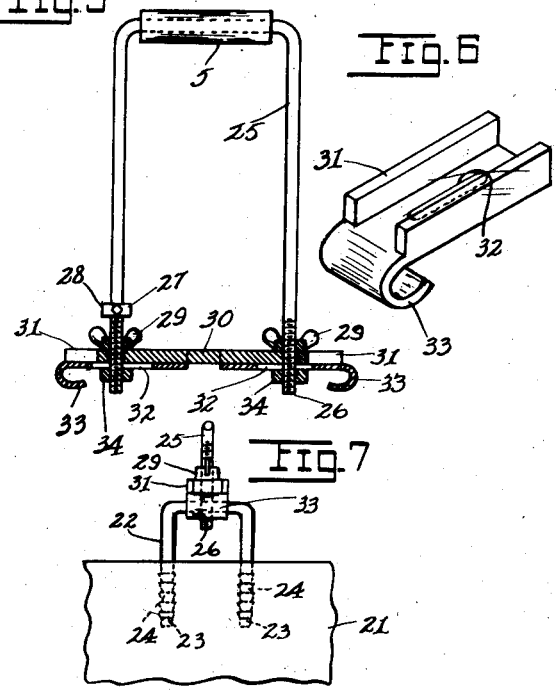
Fig. 6
Fig. 7
INVENTOR.
C. W. HAZELETT
BY Ira J. Adams
ATTORNEY

UNITED STATES PATENT OFFICE.

CLARENCE W. HAZELETT, OF LAKEWOOD, OHIO, ASSIGNOR TO NATIONAL CARBON COMPANY, INC., A CORPORATION OF NEW YORK.

STORAGE-BATTERY LAMP.

1,338,222.   Specification of Letters Patent.   Patented Apr. 27, 1920.

Application filed October 2, 1918. Serial No. 256,586.

*To all whom it may concern:*

Be it known that I, CLARENCE W. HAZELETT, a citizen of the United States, residing at Lakewood, in the county of Cuyahoga and State of Ohio, have invented a certain new and useful Improvement in Storage-Battery Lamps, of which the following is a full, clear, and exact description.

This invention relates to portable storage battery lamps for industrial purposes. The portable storage battery lamp generally consists of the combination with an automobile searchlight and a nitrogen or high efficiency lamp. The illumination which can be secured from this combination is enough for most kinds of night work and the field of usefulness is very large.

The principal objection to this type of lamp lies in the inconvenience of carrying an ordinary storage battery, which is quite heavy and large, and a searchlight for use therewith.

My invention accordingly relates to a storage battery lamp which may be conveniently carried from place to place. Another aspect of my invention relates to a lamp attachment which may be used with most existing storage batteries of the portable type used in automobiles or for similar purposes.

In the accompanying drawings which illustrate the invention:—

Figure 1 is a side view of my storage battery lamp with the searchlight reflector in the position it occupies when the outfit is being carried around.

Fig. 2 is a front view of Fig. 1.

Fig. 3 is a side view of the lamp shown in Fig. 1 with the reflector in position for illumination purposes.

Fig. 4 is a side view of a battery lamp having an ordinary portable battery, the reflector being in the position it occupies when the light is not in use.

Fig. 5 is a cross section through the center of the carrying member.

Fig. 6 is an isometric projection of an element of the carrying member.

Fig. 7 is a side view of a portion of the battery and carrying member of Fig. 4.

Referring particularly to Figs. 1 to 3, the battery 1 has a bail shaped handle 2, the ends 3 of which are attached to the wooden casing of the battery by any suitable means, as for example, by forming rings 4 on the ends 3 and driving these into holes in the top edge of the wooden casing as described in my copending application, Serial No. 218,365, filed Feb. 20, 1918. The grip 5 on the bail is spaced a considerable distance above the battery and on one of the arms 2 of the bail a washer 6 is fitted to serve as a support for a bracket 7 swiveled on the arm 2. A thumb nut 8 is adapted to clamp the bracket in position on the arm. The other end of the bracket has a socket 9 therein for receiving the stem 10 of a fork 11 which may be clamped in position by a thumb nut 11'.

A combined lamp and reflector 12, similar to an automobile spotlight, is mounted on the fork by means of two lugs 13, 13 and a bolt 14 which passes through the lugs 13, 13 and the arms of the fork 11 and is fastened by means of a thumb nut 15. The lamp is provided with the ordinary switch 16 at the rear and leads 17, 17 adapted to be connected to the storage battery terminals 18, 19. This construction permits the bracket 7 to be swung on the rod 2, and the reflector to be rotated on the bolt 14.

The general arrangement described will also be applied to an ordinary portable battery 21 having handles 22 attached to the wooden casing in any manner, as for example by means of the rings 24 on the ends 23 of the handle as described in the patent application referred to previously. A bail handle 25 is provided which is similar to the bail handle 2 except that the ends 26 are screw threaded. A support 27 is fastened to one of the ends 26 above the screw threaded portion by means of a set screw 28 which serves as a support in the same manner as the washer 6. On this support the same adjustable lamp arrangement and bracket previously described are mounted, the elements being designated by the same reference characters. The threaded ends of the bail are connected to the handles 22 by the arrangement shown in section in Fig. 5. This comprises wing nuts 29 screwed on each of the threaded ends of the bail and a bar 30 placed below the wing nuts by passing the threaded ends through suitable holes spaced apart on the bar the same distance as the threaded ends of the handle. Two channel members 31 placed below the bar are slidably fitted thereon, suitable slots 32 being provided for the threaded ends of the bail to pass therethrough. Hook shaped extensions 33 adapted to retain the handles 22 are formed on one side of each of the channel members. The bar 30 and channels 31 are rigidly held together by means of the wing nuts 29 which coöperate with nuts 34 placed below the slots of the channels. To attach the adjustable arrangement to a battery the wing nuts are loosened and the channels 31 are moved along the bar 30 which serves as a guide until the hooks 33 can be fitted under the handles 22. The channels are then pushed together as far as possible to place the hooks and handles 22 in engagement before tightening the wing nuts to prevent the channels from sliding. In this manner a handle is secured which is adapted for various portable batteries and all of the advantages of the special construction of Figs. 1 to 3 is secured.

With both modifications the resultant lamp is readily carried about because the reflector can be swung between the bail where it is out of the way and not liable to be broken. When in use the bracket and reflector may be turned on the bail and then the reflector may be directed to any point where the light is required. If desired the lamp may be removed from the bail and fastened to any other convenient support, the flexible cord 17 being long enough to allow the lamp to be moved a considerable distance. The handle remains in the upright position when the battery is placed on the ground and in the adjustable type after the hooks are once fastened the bail is rigid in relation to the battery and serves as a satisfactory support for the reflector or spotlight.

Having described my invention, what I claim is:

1. In portable electric battery lamps, a battery, a bail shaped handle, means for connecting the handle to the battery, a holder for an incandescent light source, and a bracket having one end fastened to one of the arms of the bail, said bracket being rotatable and adapted to describe a circle around said arm whereby the holder may be placed between the arms of the bail for the purposes described.

2. In portable electric battery lamps, a casing for a battery, a bail shaped handle, means for connecting the handle to the casing, a reflector adapted to receive an incandescent light source, and a bracket having one end fastened to one of the arms of the bail, said bracket being rotatable and adapted to describe a circle around said arm whereby the reflector may be placed between the arms of the bail for the purposes described.

3. In portable electric storage battery lamps, a casing for a storage battery, a bail shaped handle, means for connecting the handle to the casing, a bracket swiveled on one of the arms of the bail, a socket in the free end of the bracket and a reflector adapted to receive an incandescent light source, said reflector having a stud adapted to fit in the socket.

4. In portable electric storage battery lamps, a casing for a storage battery, a pair of handles fastened to the casing on opposite sides thereof, a pair of hooks adapted to engage the handles, a bail shaped handle having two depending arms, means for connecting the ends of the arms to the hooks, a bracket swiveled on one of the arms and means for carrying an incandescent light source mounted on the free end of the bracket and adapted to be placed between the arms of the bail.

5. In portable electric storage battery lamps, a casing for a storage battery, a pair of handles fastened to the casing on opposite sides thereof, a pair of hooks adapted to engage the handles, said hooks having slotted extensions, a bail shaped handle having two depending arms, one of said arms passing through each of the slotted extensions, means for fastening the arms to the hook extensions, a bracket swiveled on one of the arms and means for carrying an incandescent light source mounted on the free end of the bracket and adapted to be placed between the arms of the bail.

6. In portable electric storage battery lamps, a casing for a storage battery, a pair of handles fastened to the casing on opposite sides thereof, a pair of channel shaped members each having a slot therein and a hook extending from one end of each channel adapted to engage the handles, a bail shaped handle having two depending arms passing through the slots, means for connecting the ends of the arms to the channels, a bracket swiveled on one of the arms and a reflector for carrying an incandescent light source mounted on the free end of the bracket and adapted to be placed between the arms of the bail.

7. In portable electric storage battery lamps, a casing for a storage battery, a pair of handles fastened to the casing on opposite sides thereof, a pair of channel shaped members each having a slot therein and a hook extending from one end of each channel adapted to engage the handles, a bail shaped handle having two depending arms passing through the slots, a bar adapted to be fitted in the channels and having holes for passing the depending arms of the bail therethrough, means for clamping the bar and channels to the ends of the arms of the bail, a bracket swiveled on one of the arms and a reflector for carrying an incandescent light source mounted on the free end of the bracket and adapted to be placed between the arms of the bail.

8. In portable electric storage battery lamps, a casing for a storage battery, a pair of handles fastened to the casing on opposite sides thereof, a pair of channel shaped members each having a slot therein and a hook extending from one end of each channel adapted to engage the handles, a bail shaped handle having two depending arms passing through the slots, said arms having screw threaded ends adapted to be fitted in the channels and having holes for passing the threaded ends of the bail therethrough, a pair of nuts on each threaded end for clamping the bar and channels to the ends of the arms of the bail, a bracket swiveled on one of the arms, and a reflector for carrying an incandescent light source mounted on the free end of the bracket and adapted to be placed between the arms of the bail.

In testimony whereof, I hereunto affix my signature.

C. W. HAZELETT.